US012661869B2

(12) United States Patent
Kim et al.

(10) Patent No.: US 12,661,869 B2
(45) Date of Patent: Jun. 23, 2026

(54) ELECTRICAL STEEL SHEET LAMINATE HAVING HIGH STACKING FACTOR AND COMPRISING A POLYMERIC ADHESIVE LAYER COMPRISING NANOPARTICLES OF SiO2, TiO2 AND/OR ZnO

(71) Applicant: POSCO Co., Ltd, Pohang-si (KR)

(72) Inventors: Jungwoo Kim, Pohang-si (KR);
Bongwoo Ha, Pohang-si (KR);
Donggyu Lee, Pohang-si (KR);
Taeyoung No, Pohang-si (KR);
Gyeongryeol Park, Pohang-si (KR)

(73) Assignee: POSCO CO., LTD, Pohang-si (KR)

( * ) Notice: Subject to any disclaimer, the term of this patent is extended or adjusted under 35 U.S.C. 154(b) by 164 days.

(21) Appl. No.: 18/268,269

(22) PCT Filed: Dec. 20, 2021

(86) PCT No.: PCT/KR2021/019436
§ 371 (c)(1),
(2) Date: Jun. 19, 2023

(87) PCT Pub. No.: WO2022/139383
PCT Pub. Date: Jun. 30, 2022

(65) Prior Publication Data
US 2024/0051269 A1    Feb. 15, 2024

(30) Foreign Application Priority Data
Dec. 21, 2020    (KR) ........................ 10-2020-0180179

(51) Int. Cl.
B32B 15/18 (2006.01)
B32B 7/12 (2006.01)
(Continued)

(52) U.S. Cl.
CPC ................ B32B 15/18 (2013.01); B32B 7/12 (2013.01); B32B 15/043 (2013.01); B32B 37/12 (2013.01);
(Continued)

(58) Field of Classification Search
CPC ..... B32B 15/18; B32B 15/011; B32B 15/043; B32B 7/12; B32B 37/12; B32B 37/1284;
(Continued)

(56) References Cited

U.S. PATENT DOCUMENTS

| | | | |
|---|---|---|---|
| 5,955,201 A | 9/1999 | Loudermilk et al. | |
| 2013/0209789 A1* | 8/2013 | Takeda ................... | C22C 38/06 428/327 |

(Continued)

FOREIGN PATENT DOCUMENTS

| | | |
|---|---|---|
| CN | 1227860 A | 9/1999 |
| CN | 105765106 A | 7/2016 |

(Continued)

OTHER PUBLICATIONS

Japanese Office Action dated Jun. 11, 2024 issued in Japanese Patent Application No. 2023-537541.
(Continued)

*Primary Examiner* — Hoa (Holly) Le
(74) *Attorney, Agent, or Firm* — Morgan Lewis & Bockius LLP

(57) ABSTRACT

The present invention relates to an electrical steel sheet laminate, and provided is an electrical steel sheet laminate comprising: a plurality of electrical steel sheets; and polymer adhesive layers positioned between the electrical steel sheets, wherein the coating thickness of the polymer adhesive layers is 1.8-5.4 μm, the space factor of the laminate is 95.8-98.5%, and the following mathematical formula 1 is satisfied. [Mathematical Formula 1] 172.4≤space factor (%)×thickness (μm)≤531.

$$172.4 \leq \text{space factor } (\%) \times \text{thickness}(\mu m) \leq 531 \qquad \text{[Equation 1]}$$

9 Claims, 2 Drawing Sheets

100

(51) Int. Cl.

| | |
|---|---|
| *B32B 15/04* | (2006.01) |
| *B32B 37/12* | (2006.01) |
| *B32B 37/18* | (2006.01) |
| *H02K 1/02* | (2006.01) |

(52) U.S. Cl.

CPC .......... *B32B 37/1284* (2013.01); *B32B 37/18* (2013.01); *H02K 1/02* (2013.01); *B32B 2037/1253* (2013.01); *B32B 2255/06* (2013.01); *B32B 2255/26* (2013.01); *B32B 2305/72* (2013.01); *B32B 2307/206* (2013.01); *B32B 2307/748* (2013.01); *B32B 2309/12* (2013.01); *B32B 2311/30* (2013.01); *B32B 2457/00* (2013.01)

(58) Field of Classification Search

CPC ............ B32B 2305/72; B32B 2309/12; B32B 2311/30

See application file for complete search history.

(56) References Cited

U.S. PATENT DOCUMENTS

| | | | |
|---|---|---|---|
| 2017/0117758 A1 | 4/2017 | Nakagawa et al. | |
| 2019/0010567 A1* | 1/2019 | Kim ...................... | C22C 38/008 |

FOREIGN PATENT DOCUMENTS

| | | | |
|---|---|---|---|
| CN | 106574374 A | 4/2017 | |
| CN | 108473844 A | 8/2018 | |
| CN | 109263235 A | 1/2019 | |
| EP | 3733805 A1 | 11/2020 | |
| JP | H06-182929 A | 7/1994 | |
| JP | H07-256206 A | 10/1995 | |
| JP | H11-241173 A | 9/1999 | |
| JP | 2011-168836 A | 9/2011 | |
| JP | 2012-046825 A | 3/2012 | |
| JP | 2012-174739 A | 9/2012 | |
| JP | 2016-009710 A | 1/2016 | |
| JP | WO2018/116881 A1 | 12/2018 | |
| JP | 2020-125436 A | 8/2020 | |
| KR | 10-2007-0085443 A | 8/2007 | |
| KR | 10-1448598 B1 | 10/2014 | |
| KR | 10-2015-0061472 A | 6/2015 | |
| KR | 10-2015-0074817 A | 7/2015 | |
| KR | 10-2016-0017851 A | 2/2016 | |
| KR | 10-2017-0074110 A | 6/2017 | |
| KR | 10-2019-0077985 A | 7/2019 | |
| KR | 10-2020-0036536 A | 4/2020 | |
| WO | 2016/017132 A1 | 2/2016 | |

OTHER PUBLICATIONS

International Search Report dated Mar. 24, 2022, issued in International Patent Application No. PCT/KR2021/019436 (with English translation).

European Search Report dated Apr. 3, 2024 issued in European Patent Application No. 21911450.1.

Chinese Office Action and Search Report dated Feb. 25, 2026 issued in Chinese Patent Application No. 202180089867.7 (with English translation).

* cited by examiner

100

ELECTRICAL STEEL SHEET LAMINATE HAVING HIGH STACKING FACTOR AND COMPRISING A POLYMERIC ADHESIVE LAYER COMPRISING NANOPARTICLES OF SiO2, TiO2 AND/OR ZnO

CROSS-REFERENCE OF RELATED APPLICATIONS

This application is the U.S. National Phase under 35 U.S.C. § 371 of International Patent Application No. PCT/KR2021/019436, filed on Dec. 20, 2021, which in turn claims the benefit of Korean Application No. 10-2020-0180179, filed on Dec. 21, 2020, the disclosures of which applications are incorporated by reference herein.

TECHNICAL FIELD

The present invention relates to an electrical steel sheet laminate. More particularly, the present invention relates to an electrical steel sheet laminate in which a polymer adhesive layer capable of bonding (fastening) an electrical steel sheet is formed without using existing fastening methods, such as welding, clamping, and interlocking.

BACKGROUND ART

Non-oriented electrical steel sheets are steel sheets with uniform magnetic properties in all directions on a rolled sheet and have been widely used in motors, iron cores of generators, electric motors, and small transformers.

Electrical steel sheets may be divided into two types: one is an electrical steel sheet on which stress relief annealing (SRA) needs to be performed to improve magnetic properties after punching and the other is an electrical steel sheet on which SRA is omitted when cost loss due to heat treatment is greater than the magnetic property effect by SRA.

An insulating coating is a coating applied in a finishing manufacturing process of laminates, such as motors, iron cores of generators, electric motors, and small transformers, and generally requires electrical properties to suppress the occurrence of eddy currents. In addition, continuous punching workability, adhesion resistance, and surface adhesion are required. Continuous punching workability refers to the ability to suppress wear of a mold when forming an iron core by stacking a plurality of electrical steel sheets after punching into a predetermined shape.

Adhesion resistance refers to the ability to prevent adhesion between iron core steel sheets after the SRA process in which the magnetic properties are restored by removing the working stress of the steel sheet.

In addition to these basic properties, excellent application workability of a coating solution and solution stability that allows the use for a long time after mixing are also required. Such an insulating coating may be manufactured as an electrical steel sheet laminate by using a separate fastening method, such as welding, clamping, or interlocking.

DISCLOSURE

Technical Problem

The present invention attempts to provide an electrical steel sheet laminate including a polymer adhesive layer capable of bonding (fastening) electrical steel sheets without using existing fastening methods, such as welding, clamping, and interlocking, and a manufacturing method thereof.

Technical Solution

An exemplary embodiment of the present invention provides an electrical stell sheet laminate including a plurality of electrical steel sheets; and a laminate including a polymer adhesive layer positioned between the electrical steel sheets, wherein the coating thickness of the polymer adhesive layer is 1.8 to 5.4 μm, a stacking factor of the laminate is 95.8 to 98.5%, and Equation 1 below is satisfied.

$$172.4 \leq \text{stacking factor (\%)} \times \text{thickness}(\mu m) \leq 531 \qquad \text{[Equation 1]}$$

The laminate may satisfy Equation 2 below.

$$40 \leq \text{shear adhesive strength}(MPa) \times \text{high temperature adhesive strength}(MPa) \leq 130 \qquad \text{[Equation 2]}$$

(wherein high-temperature adhesive strength is measured in accordance with ISO 4587 standard under the condition of 150° C.)

Shear adhesive strength of the laminate may be 4.8 to 17.9 MPa.

High-temperature adhesive strength of the laminate may be 5 to 7.2 MPa.

Surface insulation resistance of the polymer adhesive layer in the laminate may be 90 to 160Ω.

An inorganic content in the polymer adhesive layer in the laminate may be 5 to 30 wt.

An anti-sticking temperature of the polymer adhesive layer in the laminate may be 110 to 195° C.

An anti-automatic transmission fluid (ATF) temperature of the laminate may be 150 to 190° C.

Tensile adhesive strength of the laminate may be 1.2 to 13 N/mm².

Another exemplary embodiment of the present invention provides a method of manufacturing an electrical steel sheet laminate including: forming a polymer adhesive layer on an electrical steel sheet by applying a coating composition including 70 to 95 wt % of resin and 5 to 30 wt % of at least one inorganic nanoparticles among SiO₂, TiO₂, and ZnO as a solid content to a steel sheet, curing the coating composition by heat treatment, and adjusting pressure of a bar coater, a roll coater, and the steel sheet to 50 to 1500 kgf for steel sheet with an area of 50 mm×50 mm when the coating composition is applied; and laminating the electrical steel sheet on which the polymer adhesive layer is formed.

Advantageous Effects

According to an exemplary embodiment of the present invention, electrical steel sheets may be bonded without using existing fastening methods, such as welding, clamping, and interlocking, so that the electrical steel sheet laminate has excellent magnetic properties.

MODE FOR INVENTION

Hereinafter, exemplary embodiments of the present invention will be described in detail. However, the exemplary embodiments are presented as examples, and the present invention is not limited thereby and is only defined by the scope of the claims to be described later.

An exemplary embodiment of the present invention provides an electrical steel sheet laminate.

Figure 1:
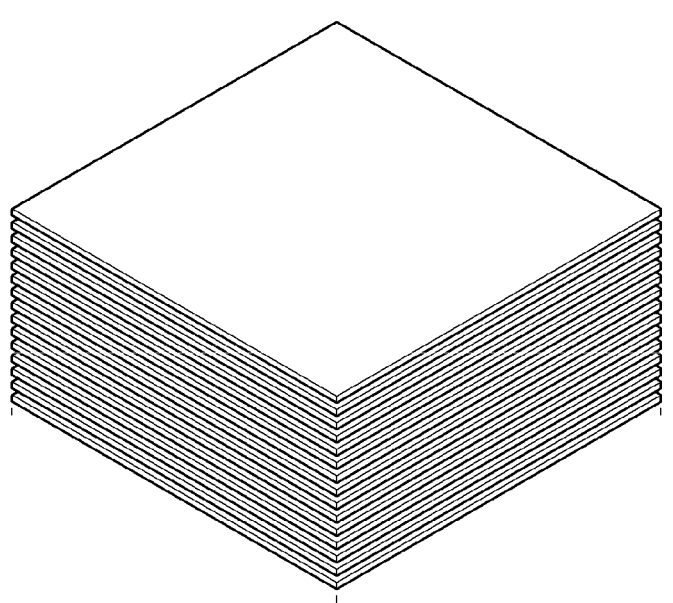
FIG. 1 is a schematic diagram of an electrical steel sheet laminate.

More specifically, the electrical steel sheet laminate according to an exemplary embodiment of the present invention includes a plurality of electrical steel sheets; and a polymer adhesive layer positioned between the plurality of electrical steel sheets. FIG. 1 shows a schematic diagram of an electrical steel sheet laminate according to an exemplary embodiment of the present invention. As shown in FIG. 1, a plurality of electrical steel sheets are stacked.

Figure 2:
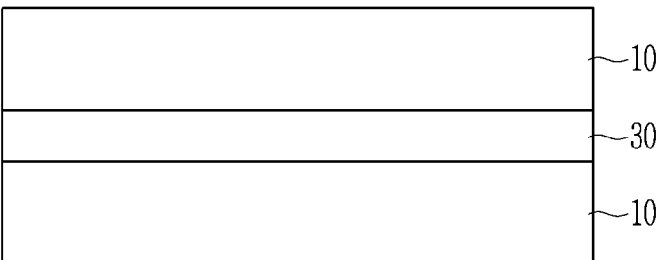
FIG. 2 is a schematic view of a cross-section of an electrical steel sheet laminate according to an exemplary embodiment of the present invention.

FIG. 2 shows a schematic view of a cross-section of an electrical steel sheet laminate according to an exemplary embodiment of the present invention. As shown in FIG. 2, an electrical steel sheet laminate 100 according to an exemplary embodiment of the present invention includes a plurality of electrical steel sheets 10; and a polymer adhesive layer 30 positioned between the plurality of electrical steel sheets.

The electrical steel sheet laminate according to an exemplary embodiment of the present invention may be a laminate in which different electrical steel sheets are thermally fused by forming a polymer adhesive layer simply using the adhesive coating composition described above, without using existing methods, such as welding, clamping, and interlocking.

At this time, the electrical steel sheet laminate has excellent properties, such as high-temperature adhesion and high-temperature oil resistance even after thermal fusion.

Hereinafter, each component will be described in detail.

As the electrical steel sheet 10, a general non-oriented or oriented electrical steel sheet may be used without limitation. In an exemplary embodiment of the present invention, since the main configuration is to manufacture the electrical steel sheet laminate 100 by forming the polymer adhesive layer 30 between a plurality of electrical steel sheets 10, detailed description of the electrical steel sheet 10 is omitted.

The polymer adhesive layer 30 is formed between the plurality of electrical steel sheets 10, and has adhesive strength strong enough to bond the plurality of electrical steel sheets 10 without using existing fastening methods, such as welding, clamping, and interlocking.

The polymer adhesive layer 30 is formed by coating a surface with an adhesive coating composition and curing the adhesive coating composition to form an adhesive coating layer, and laminating and thermally fusing the same.

When a plurality of electrical steel sheets 10 having the adhesive coating layer are laminated and thermally fused, resin components in the adhesive coating layer are thermally fused to form the polymer adhesive layer.

In the polymer adhesive layer, an inorganic metal compound is included in a main component of an organic material. In the polymer adhesive layer, inorganic components may be uniformly dispersed in the organic material to form a microphase.

More specifically, in the electrical steel sheet laminate according to an exemplary embodiment of the present invention, a coating thickness of the polymer adhesive layer is 1.8 to 5.4 μm, a stacking factor of the laminate is 95.8 to 98.5%, and Equation 1 below may be satisfied.

$$172.4 \leq \text{stacking factor (\%)} \times \text{thickness}(\mu m) \leq 531 \qquad \text{[Equation 1]}$$

Assuming that the thickness of the material is the same, generally, when the coating thickness increases, the stacking factor decreases, and accordingly, surface insulation resistance also increases. However, because the decrease in the stacking factor according to the coating thickness is not a linear change, adjusting the stacking factor to an optimal range is essential to the current market requirements. More specifically, the value of Equation 1 may be 390 to 450.

More specifically, the laminate may satisfy Equation 2 below.

$$40 \leq \text{shear adhesive strength}(MPa) \times \text{high temperature adhesive strength}(MPa) \leq 130 \qquad \text{[Equation 2]}$$

(However, the high-temperature adhesive strength is a value measured in accordance with ISO 4587 standards under the condition of 150° C.)

Shear adhesive strength and high-temperature adhesive strength are properties that are difficult to improve simultaneously depending on the inorganic content and polymer compositions. The shear adhesive strength improves as the content of the polymer resin in a bonding solution increases and the content of inorganic materials decreases, while the high-temperature adhesive strength improves as the content of the resin in the bonding solution decreases and the content of inorganic materials increases. However, depending on the resin and inorganic content of the bonding solution, the shear adhesive strength and the high-temperature adhesive strength are not in a linearly inversely proportional relationship, so adjusting them to the optimal range is essential to the current market requirements. These seemingly contradictory factors may be adjusted to fit the needs of the market. More specifically, the value of Equation 2 may be 80 to 130.

If a laminate is configured to satisfy these factors, a laminate (core) capable of satisfying all of the various characteristics required in the current EV market may be obtained.

The above factors may be obtained by applying a coating composition including 70 to 95 wt % of resin and 5 to 30 wt % of at least one inorganic nanoparticles among $SiO_2$, $TiO_2$, and ZnO as a solid content to a steel sheet and curing the coating composition by heat treatment, and in this case, pressure of a roll coater and the steel sheet is adjusted to 50 to 1500 kgf for steel sheet with an area of 50 mm×50 mm when the coating composition is applied. More specifically, the above factors may be obtained by adjusting the pressure of a roll coater and the steel sheet to 100 to 1200 kgf for steel sheet with an area of 50 mm×50 mm.

An average particle diameter of $SiO_2$ may be 10 to 30 nm, an average particle diameter of $TiO_2$ may be 30 to 50 nm, and an average particle diameter of ZnO may be 70 to 100 nm.

The resin may be an epoxy-based resin, may have a weight average molecular weight of 8,000 to 15,000 g/mol, and may have a glass transition temperature of 70 to 90° C.

Each factor will be described in detail below.

Coating Thickness

A coating thickness of the self-bonding product is 1.8 to 5.4 μm. If the coating thickness is less than 1.8 μm, adhesive strength may be inferior and insulation breakdown may occur in a high frequency region. Meanwhile, if the coating thickness is too large, a motor core stacking factor may be inferior. A more specific range may be 4.0 to 4.5 μm.

More specifically, if the coating thickness is less than 1.8 μm, insulation breakdown between the sheet cores occurs when the motor rotates at a high speed, resulting in reduced motor efficiency. In addition, if the coating thickness is greater than 5.4 μm, the coating layer thickness may excessively increase, so that the bonding layer may flow out to the side during a motor core assembly process and a stacking factor of the motor core may decrease.

The coating thickness may be controlled by the physical properties (specific gravity, viscosity, solid content) of the bonding solution. When the bonding solution includes a specific gravity of 1.05 to 1.4, a viscosity (cps) of 5 to 100, or a solid content (wt %) of 5 to 50, the above range of coating thickness may be satisfied.

The coating thickness was measured by a Fourier Transform Infra-Red Spectroscopy (FT-IR) coating thickness meter. The FT-IR is an analysis method using the properties of molecules to absorb frequencies corresponding to the natural frequency thereof, which is based on a principle of reading a spectrum of a wavelength detected by reflecting infrared rays to a material.

Stacking Factor

The stacking factor of self-bonding products is 95.8 to 98.5% based on a material thickness of 0.27 mm. This range may be adjusted in consideration of a fastening strength of the motor core, a manufacturing defect rate, motor efficiency, and insulation breakdown.

If the stacking factor is less than 95.8%, the coating thickness may increase to deteriorate motor efficiency and defects in which the bonding solution leaks may occur during the manufacturing process of the motor core. Meanwhile, if the stacking factor is greater than 98.5%, the coating thickness is too thin, so not only the fastening strength may be inferior, but also an insulation breakdown phenomenon between the sheet cores may occur.

The stacking factor may be controlled by the coating thickness applied to the surface of the non-oriented electrical steel sheet.

The stacking factor is expressed as % by measuring the stacking factor of a specimen formed of a strip cut from an electrical steel sheet [{Pressure: $1N/(10.2 \text{ kgf/cm}^2)$}/{Stacking factor (%)=actual weight/calculated weight (width× length×density×height)×100)}].

Shear Adhesive Strength

The shear adhesive strength of the self-bonding product is 4.8 MPa or more and 17.9 MPa or less. The shear adhesive strength of the self-bonding product at 180° C. is preferably 14.9 MPa or more and 17.9 MPa or less to prevent assembly defects due to thermal shock in the motor assembly process.

If the shear adhesive strength is lower than the above range, adhesion to the side of the core and to the slot portion during manufacturing of the motor core may not be made, resulting in defects in the motor assembly process and increased noise/vibration of the motor.

Meanwhile, if the shear adhesive strength exceeds the above range, it may not be easy to separate the core in the case of fusion in a mold because adhesive strength is too high, thereby reducing productivity.

The shear adhesive strength may be controlled by the content of the inorganic material included in the polymer resin. When 0.1 to 60 wt % of the inorganic material is included based on the total wt %, shear adhesive strength within the above range may be satisfied. In this case, a more preferable inorganic content may be 5 to 30 wt %.

The types of inorganic materials used in this case are nano-scale silica particles and metal phosphate alone or a mixture of the two inorganic materials.

Shear adhesive strength was a value measured using a shear meter. The shear adhesive strength was a value measured in accordance with the ISO 4587 standard after preparing two specimens (thickness: 0.27 mm, size: 100×25 mm), overlapping both ends of the specimens by 12.5 mm, and then performing fusion under certain conditions (temperature: 220° C., pressure: 3 MPa, time: 30 minutes).

High-temperature adhesive strength (150° C. or higher)

The high-temperature adhesive strength (150° C. or more) has a shear adhesive strength of 5 to 7.2 MPa based on 180° C.

If the high-temperature adhesive strength (150° C. or more) is less than 5 MPa based on 180° C., not only the fastening force when manufacturing the bonding core may be inferior, but also anti-automatic transmission fluid (ATF) properties may be inferior. Meanwhile, when the high-temperature adhesive strength is greater than 7.2 MPa, workability may be deteriorated when manufacturing the bonding core because thermal fusion must be performed at a high temperature for high high-temperature adhesive strength.

The high-temperature adhesive strength may be controlled by the type of polymer chain and the curing temperature of the coating. When the ratio of the network type or crosslinked polymer chain is 50 to 99 wt % based on 100 wt % of the bonding solution and the curing temperature is 150 to 300° C., the high-temperature adhesive strength in the above range may be satisfied.

The high-temperature adhesive strength was a value measured using a universal testing system. The high-temperature adhesive strength was a value measured in accordance with the ISO 4587 standard after preparing two specimens (thickness: 0.27 mm, size: 100×25 mm), overlapping both ends of the specimens by 12.5 mm, and performing thermal fusion to prepare a sample for measuring a shear adhesive length, and maintaining the prepared sample at 150° C. or higher for 1 minute.

Surface Insulation Resistance

Surface insulation resistance of self-bonding products is 90 to 160 $\Omega \cdot \text{mm}^2$/lam, where "lam" refers to an individual electrical steel lamination sheet. If the coating thickness is too large to secure high insulation resistance, a stacking factor of the motor core may be inferior. If the coating thickness is too small, in the case of a drive motor operating in a high-frequency region, an insulation breakdown phenomenon between sheet cores may occur, resulting in a decrease in motor efficiency.

If the surface insulation resistance is less than 90 $\Omega \cdot \text{mm}^2$/lam, where "lam" refers to an individual electrical steel lamination sheet, insulation breakdown between the sheet cores may occur when the motor rotates at a high speed, thereby degrading the motor efficiency. Also, if the surface insulation resistance exceeds 160 $\Omega \cdot \text{mm}^2$/lam, where "lam" refers to an individual electrical steel lamination sheet, the thickness of the coating layer may be excessively large, resulting in defects in assembling the motor core, as well as deterioration in the stacking factor of the motor core.

The surface insulation resistance may be controlled by the coating thickness applied to one side of the self-bonding product and the content of inorganic materials in the coating layer. When the coating thickness applied to one surface is 1.0 to 6.0 μm, the surface insulation resistance within the above range may be satisfied. In addition, when the coating thickness is limited to 1.8 to 5.4 μm and the content of the inorganic material includes 5 to 30 wt % of inorganic material based on the total wt %, surface insulation resistance within the above range may be satisfied.

The types of inorganic materials used in this case are nano-scale silica particles and metal phosphate alone or a mixture of the two inorganic materials.

The surface insulation resistance is a resistance value converted from a current value measured by the Franklin Insulation Tester by the formula (Ri (insulation resistance)= 645 ((1/I (current mA))−1) $\Omega \text{ mm}^2$/lam, where "lam" refers to an individual electrical steel lamination sheet). This measuring instrument, as a single-plate test method device, is a device (ASTM A717) that measures the surface insulation resistance of the electrical steel sheet under constant pressure and constant voltage, has a range of current of 0 to 1.000 Amp, and performs measurement under constant pressure (20.4 atm).

Anti-Sticky Temperature

An anti-sticky temperature of the self-bonding product is 110 to 195° C.

If the anti-sticking temperature is less than 110° C., the bonding layers may stick to each other during coil winding, resulting in poor slitting, punching and bonding core shape quality. Meanwhile, if the anti-sticking temperature exceeds 195° C., a thermal fusion temperature may be too high during manufacturing of the bonding core to deteriorate the productivity of the motor core.

The anti-sticky temperature may be controlled by a glass transition temperature (Tg) of the bonding solution. When the glass transition temperature (Tg) is −50 to 100° C., the anti-sticky temperature in the above range may be satisfied.

The anti-sticky temperature was expressed as a temperature at which specimens stick to each other after pressing the material of 0.27 mmt laminated by 100 mm×100 mm×10 mm for 30 minutes under 3 MPa.

Anti-ATF Temperature

The anti-ATF temperature is 150 to 190° C. The anti-ATF temperature may be adjusted considering that the motor is actually cooled by direct/indirect contact with ATF oil.

If the anti-ATF temperature is less than 150° C., fastening strength of the motor core may be inferior due to ATF oil to ultimately increase noise/vibration of the motor and deteriorate efficiency.

Meanwhile, if the anti-ATF temperature exceeds 190° C., not only the ATF oil is deteriorated, but also the motor efficiency may be reduced due to a demagnetization phenomenon caused by an increase in temperature of the magnet mounted on a rotor core due to a high ATF temperature.

The anti-ATF temperature may be controlled by the glass transition temperature (Tg) of the bonding solution. When the glass transition temperature (Tg) is −50 to 100° C., the anti-ATF temperature in the above range may be satisfied.

The anti-ATF temperature was expressed as a temperature at which fastening strength did not decrease after a bonded specimen was immersed in ATF oil for 500 hours at 180° C. The specimen was manufactured in accordance with the ISO 4587 standard and fastening strength thereof was measured.

Tensile Adhesive Strength

Tensile adhesive strength of the sheet bonding layer is 1.2 or more and 13 N/mm$^2$ or less based on room temperature.

If the tensile adhesive strength of the product is less than 1.2 N/mm$^2$ based on room temperature, fastening force may be inferior when manufacturing the bonding core. Meanwhile, if the tensile strength is 13 N/mm$^2$ or more, the tensile strength may be too strong, resulting in poor workability during the manufacturing of the bonding core.

The tensile adhesive strength may be controlled by a bonding core fusion temperature. When manufacturing the bonding core, the above range of tensile strength may be satisfied when the thermal fusion temperature is 100° C. to 250° C. At this time, required thermal fusion pressure is 1.0 to 5 N/mm$^2$.

The tensile strength was a value obtained with 50 mm×50 mm×10 mm by a tension meter at room temperature after thermal fusion at 100° C. to 250° C. presented above.

Punchability

Punchability of self-bonding products is 3 million strokes or more and 5 million strokes or less.

If the punchability is less than 3 million strokes, the unit cost of manufacturing a mold may increase, and meanwhile, if the punchability is more than 5 million strokes, a burr height of the motor core may increase due to increased wear of the mold, resulting in defective motor core shapes.

Punchability may be controlled by the coating thickness of the self-bonding product and the inorganic content in the coating layer.

The punchability was evaluated for 0.27 mm self-bonding product by a mold machine dedicated to electrical steel sheets. The punching evaluation conditions were 8% clearance and 8 hours per day at 350 SPM (Spot Per Minute).

Curing Temperature

The curing temperature of the self-bonding product is 100 or more and 300° C. or less. It is preferably 150 or more and 250° C. or less in consideration of the anti-sticky properties and field workability during the coating operation.

If the curing temperature of the self-bonding product is less than 100° C., bonding layers may stick to each other during coil winding after in-line coating. Meanwhile, if the curing temperature is higher than 250° C., the bonding layer may deteriorate or become hard, resulting in inferior fastening force.

In order to control the curing temperature, the amount of curing agent added to a bonding solution may be controlled. When 0.01 to 10 wt % of the curing agent is included based on the total wt %, the curing temperature in the above range may be satisfied.

The curing temperature of the self-bonding product was measured by a non-contact thermocouple (TC) for a pick metal temperature (PMT) of the material.

Hereinafter, preferred examples and comparative examples of the present invention are described. However, the following examples are only preferred examples of the present invention, and the present invention is not limited by the following examples.

Experimental Example 1

A non-oriented electrical steel sheet (50×50 mm, 0.35 mm) was prepared as a blank specimen. An adhesive coating solution was applied to top and bottom of each prepared blank specimen to have a constant thickness (about 5.0 μm) using a bar coater or roll coater, cured at 220° C. for 20 seconds based on a pick metal temperature (PMT), and then cooled slowly in the air to form an adhesive coating layer. During application, pressure of the roll coater and the steel sheet was adjusted to 1000 kgf for steel sheet with an area of 50 mm×50 mm.

After laminating electrical steel sheets coated with the adhesive coating layer to a height of 20 mm, the electrical steel sheets were thermally fused at 120° C. for 10 minutes by pressing with a force of 0.1 MPa. Components of a thermally fused layer and various characteristics of the thermally fused electrical steel sheet are summarized in Tables 1 to 3 below.

A composition of the coating solution used in this case is as follows. The content of the inorganic materials used was adjusted and tested as shown in the table below.

Components of the applied bonding solution are indicated below. A resin used in the present invention is an epoxy-based resin and has a weight average molecular weight of 10,000 g/mol and a glass transition temperature of 80° C. In addition, as inorganic materials, SiO2, TiO2, and ZnO were used alone or in combination of two or more, and the sizes of inorganic nanoparticles were SiO2 of 15 nm, TiO2 of 40 nm, and ZnO of 80 nm, respectively. Wt % of the resin and inorganic materials is wt % of solid content excluding water or solvent contained in the solution.

TABLE 1

| | Comparative Example 1 | Comparative Example 2 | Comparative Example 3 | Example 1 | Example 2 | Example 3 | Example 4 | Comparative Example 4 |
|---|---|---|---|---|---|---|---|---|
| Solid content of resin (wt %) | 85 | 65 | 55 | 95 | 80 | 75 | 70 | 90 |
| Solid content of inorganic material (wt %) | 15 | 35 | 45 | 5 | 20 | 25 | 30 | 10 |

TABLE 2

| | Comparative Example 1 | Comparative Example 2 | Comparative Example 3 | Example 1 | Example 2 | Example 3 | Example 4 | Comparative Example 4 |
|---|---|---|---|---|---|---|---|---|
| Stacking factor (%) | 98.2 | 96.2 | 96.5 | 97.5 | 98.0 | 95.8 | 98.5 | 96 |
| Coating thickness ($\mu$m) | 1.8 | 2.8 | 3.2 | 4.0 | 4.2 | 4.5 | 4.4 | 5.4 |
| Stacking factor × coating thickness (% · $\mu$m) | 176.76 | 269.36 | 308.8 | 390 | 411.6 | 431.1 | 433.4 | 518.4 |
| Content of inorganic material | 15 | 35 | 45 | 5 | 20 | 25 | 30 | 10 |
| Shear adhesion (MPa) | 12.4 | 4.8 | 5.2 | 16.5 | 17.9 | 15.5 | 14.9 | 9.8 |
| High-temperature adhesive strength (MPa) | 0.7 | 4.3 | 0.5 | 5 | 7.2 | 5.2 | 6.2 | 3.4 |
| Shear adhesive strength × high-temperature adhesive strength MPa$^2$ | 8.68 | 20.64 | 2.6 | 82.5 | 128.88 | 80.6 | 92.38 | 33.32 |
| Surface insulation resistance ($\Omega$) | 452 | 250 | 350 | 100 | 98 | 154 | 103 | 88 |
| Punchability | 3.2 million | 4.54 million | 4.29 million | 3.36 million | 3.54 million | 4.2 million | 3.58 million | 3.90 million |
| Anti-sticky temperature (° C.) | 130 | 180 | 150 | 185 | 195 | 110 | 160 | 190 |
| Anti-ATF temperature (° C.) | 165 | 158 | 180 | 172 | 180 | 151 | 184 | 196 |
| Curing temperature (° C.) | 210 | 235 | 187 | 182 | 240 | 202 | 168 | 198 |
| Tensile adhesion (N/mm$^2$) | 0.9 | 8.2 | 5.4 | 12.5 | 10.8 | 1.2 | 6.4 | 4.2 |
| Comprehensive evaluation | B | B | B | A | A | A | A | B |

In the case of Comparative Examples 2 and 3, despite the small coating thickness due to the high content of inorganic materials, the stacking factor was low and the shear and high-temperature adhesive strength, as well as punchability, were inferior due to the high inorganic content and small coating thickness. In addition, Comparative Example 4 was determined to be inappropriate as an invention because the coating thickness was too large to deteriorate the stacking factor, and the high-temperature adhesive strength and anti-sticky temperature were high.

In addition, in the case of Comparative Example 1, despite the fact that the coating thickness and stacking factor fall within the preferred range, the stacking factor (%)× thickness (μm) of [Equation 1] is not satisfied, and thus, the high-temperature adhesive strength was inferior, the surface insulation resistance was inferior, and the tensile strength also exhibited poor characteristics. Therefore, it can be seen that, since the coating thickness and the stacking factor are not factors that should be independently controlled and the decrease in the stacking factor according to the coating thickness is not a linear change, an excellent laminate may be obtained only when the relationship of [Equation 1] is satisfied.

<Comprehensive Evaluation>

(Main criteria for comprehensive evaluation: Shear adhesive strength×high-temperature adhesive strength×surface insulation resistance×coating thickness×stacking factor)

As shown in Tables 1 and 2, the self-bonding products and bonding layers related to Examples 1 to 4 have higher shear and tensile adhesive strengths than the self-bonding products and bonding layers related to Comparative Examples, both high-temperature adhesive strength and resistance satisfy the appropriate range, and thus, the comprehensive evaluation was all "A".

In the case of Comparative Examples 1 to 4, it can be seen that, two or more of the characteristics of shear adhesive strength, high-temperature adhesive strength, surface insulation resistance, coating thickness, and stacking factor are not satisfied to be applied to actual motor products, and the comprehensive evaluation was also "B" which is inferior.

Experimental Example 2

Experimental Example 2 was carried out in the same manner as that of Experimental Example 1, except that the composition of the coating solution of Example 3 was used, and the roll coater and pressure of the steel sheet were adjusted as shown in Table 3 below during application of the coating solution.

TABLE 3

| | Comparative Example 5 | Comparative Example 6 | Example 5 | Example 6 | Example 7 | Example 8 | Comparative Example 7 | Comparative Example 8 |
|---|---|---|---|---|---|---|---|---|
| Solid content of resin (wt %) | 85 | 70 | 95 | 85 | 75 | 85 | 70 | 90 |
| Solid content of inorganic material (wt %) | 15 | 30 | 5 | 15 | 25 | 15 | 30 | 10 |
| Pressure between coater and steel sheet (kgf) | 10 | 30 | 200 | 500 | 700 | 1200 | 1800 | 2000 |

TABLE 4

| | Comparative Example 5 | Comparative Example 6 | Example 5 | Example 6 | Example 7 | Example 8 | Comparative Example 7 | Comparative Example 8 |
|---|---|---|---|---|---|---|---|---|
| Stacking factor (%) | 92.2 | 93.2 | 95.5 | 96.5 | 97.5 | 97.8 | 98.5 | 96 |
| Coating thickness (μm) | 9.2 | 7.3 | 5.4 | 4.9 | 4.7 | 4.5 | 2.1 | 1.3 |
| Stacking factor × coating thickness (% · μm) | 756.0 | 587.2 | 420.2 | 376.4 | 360.8 | 342.3 | 206.9 | 124.8 |
| Content of inorganic material | 15 | 30 | 5 | 15 | 25 | 15 | 30 | 10 |
| Shear adhesion (MPa) | 3.2 | 4.1 | 10.2 | 12.5 | 12.9 | 13.5 | 2.9 | 1.8 |
| High-temperature adhesive strength (MPa) | 0.7 | 0.6 | 5.2 | 5.7 | 7.2 | 5.2 | 1.2 | 0.4 |

TABLE 4-continued

| | Comparative Example 5 | Comparative Example 6 | Example 5 | Example 6 | Example 7 | Example 8 | Comparative Example 7 | Comparative Example 8 |
|---|---|---|---|---|---|---|---|---|
| Shear adhesive strength × high-temperature adhesive strength MPa2 | 2.2 | 2.5 | 53.0 | 71.3 | 92.9 | 70.2 | 3.5 | 0.7 |
| Surface insulation resistance (Ω) | 1022 | 950 | 150 | 180 | 198 | 154 | 21 | 12 |
| Punchability | 3.3 million | 3.54 million | 4.19 million | 4.36 million | 4.54 million | 4.2 million | 2.58 million | 1.9 million |
| anti-sticky temperature (° C.) | 100 | 130 | 160 | 175 | 185 | 160 | 160 | 180 |
| Anti-ATF temperature (° C.) | 115 | 135 | 180 | 182 | 180 | 175 | 174 | 186 |
| Curing temperature (° C.) | 200 | 205 | 210 | 212 | 228 | 225 | 230 | 1235 |
| Tensile adhesion (N/mm2) | 6.4 | 7.2 | 8.4 | 10.5 | 9.8 | 10.2 | 3.4 | 2.2 |
| Comprehensive evaluation | B | B | A | A | A | A | B | B |

In the case of the examples, it is confirmed that all characteristics are excellent. Meanwhile, in the case of Comparative Examples 5 to 8, it can be seen that, two or more of the characteristics of shear adhesive strength, high-temperature adhesive strength, surface insulation resistance, coating thickness, and stacking factor are not satisfied to be applied to actual motor products, and the comprehensive evaluation was also "B" which is inferior.

The present invention is not limited to the above exemplary embodiments, but may be manufactured in a variety of different forms, and those skilled in the art to which the present invention pertains may understand that the present invention may be implemented in other specific forms without changing the technical spirit or essential features of the present invention. Therefore, the exemplary embodiments described above should be understood as illustrative in all respects and not limiting.

The invention claimed is:

1. An electrical steel sheet laminate comprising:
a plurality of electrical steel sheets; and
a laminate including a polymer adhesive layer positioned between the electrical steel sheets,
wherein the polymer adhesive layer includes 70 to 95 wt % of resin and 5 to 30 wt % of at least one inorganic nanoparticles among $SiO_2$, $TiO_2$, and ZnO,
wherein the coating thickness of the polymer adhesive layer is 1.8 to 5.4 μm,
a stacking factor of the laminate is 95.8 to 98.5%, and
Equations 1 and 2 below are satisfied:

$$172.4 \leq \text{stacking factor} \times \text{thickness}(\mu m) \leq 531 \qquad \text{[Equation 1]}$$

$$40 \leq \text{shear adhesive strength}(MPa) \times \text{high temperature adhesive strength}(MPa) \leq 130 \qquad \text{[Equation 2]}$$

(wherein the shear adhesive strength is a value measured in accordance with the ISO 4587 standard after preparing two specimens (thickness: 0.27 mmt, size: 100× 25 mm), and wherein high-temperature adhesive strength is measured in accordance with ISO 4587 standard under the condition of 150° C.).

2. The electrical steel sheet laminate of claim 1, wherein: shear adhesive strength of the laminate is 4.8 to 17.9 MPa.

3. The electrical steel sheet laminate of claim 1, wherein: high-temperature adhesive strength of the laminate is 5 to 7.2 MPa.

4. The electrical steel sheet laminate of claim 1, wherein: surface insulation resistance of the polymer adhesive layer in the laminate is 90 to 160 Ω.

5. The electrical steel sheet laminate of claim 1, wherein: an inorganic content in the polymer adhesive layer in the laminate is 5 to 30 wt %.

6. The electrical steel sheet laminate of claim 1, wherein: an anti-sticking temperature of the polymer adhesive layer in the laminate is 110 to 195° C.

7. The electrical steel sheet laminate of claim 1, wherein: an anti-automatic transmission fluid (ATF) temperature of the laminate is 150 to 190° C.

8. The electrical steel sheet laminate of claim 1, wherein n: tensile adhesive strength of the laminate is 1.2 to 13 $N/mm^2$.

9. A method of manufacturing an electrical steel sheet laminate of claim 1, the method comprising:
forming a polymer adhesive layer on an electrical steel sheet by applying a coating composition including 70 to 95 wt % of resin and 5 to 30 wt % of at least one inorganic nanoparticles among $SiO_2$, $TiO_2$, and ZnO as a solid content to a steel sheet, curing the coating composition by heat treatment, and adjusting pressure of a roll coater and the steel sheet to 50 to 1500 kgf for steel sheet with an area of 50 mm×50 mm when the coating composition is applied; and
laminating the electrical steel sheet on which the polymer adhesive layer is formed.

* * * * *